Dec. 2, 1941.  P. J. GAYLOR  2,264,438
METHOD FOR CARRYING OUT CATALYTIC REACTIONS
Filed Dec. 29, 1938
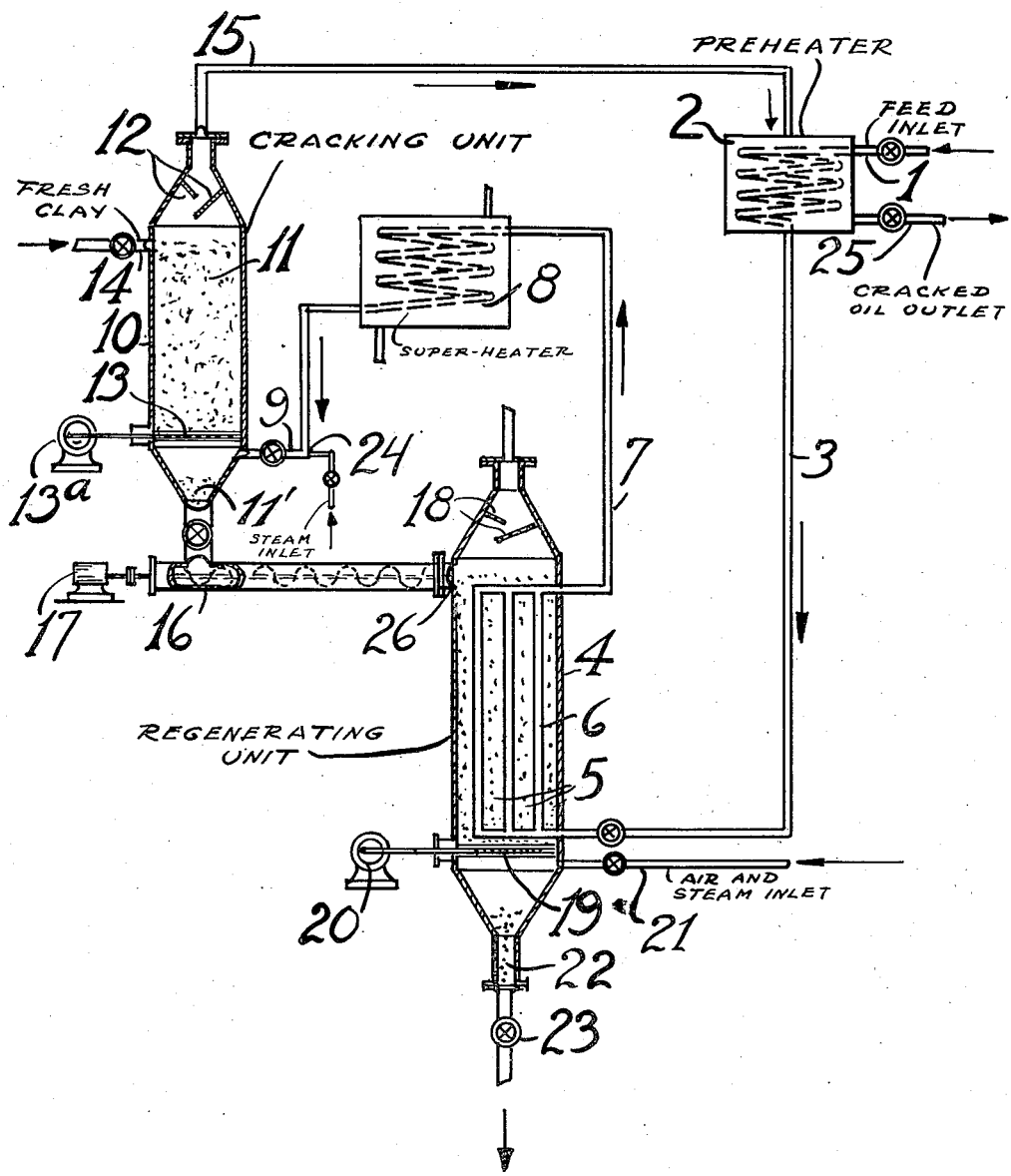
Peter J Gaylor Inventor
By ___ Young Attorney Patented Dec. 2, 1941

2,264,438

UNITED STATES PATENT OFFICE 2,264,438

METHOD FOR CARRYING OUT CATALYTIC REACTIONS

Peter J. Gaylor, Union, N. J., assignor to Standard Oil Development Company, a corporation of Delaware Application December 29, 1938, Serial No. 248,144

8 Claims. (Cl. 196—52)

This invention is directed to chemical reactions catalyzed by solid masses which become inactivated during use by the deposition thereon of combustible material. More specifically, it deals with a process for continuously carrying out chemical reactions such as the cracking, reforming, dehydrogenation, cyclization, aromatization, and the like of petroleum and other hydrocarbons in the vapor phase at elevated temperatures.

In the past, catalytic cracking and similar processes have been developed employing catalysts such as acid activated bentonites, synthetic metal gels, activated charcoal, zeolites, modified feldspars, and the like, as catalysts for the reactions. Such catalysts have been found to become inactive during use due to the deposition on their surfaces of carbonaceous material necessitating the discontinuance of the cracking operation in order to reactivate the catalytic mass. The reactivation is accomplished by stopping the cracking operation and blowing through the catalyst an oxidizing gas such as air with or without steam until substantially all of the carbonaceous inactivating material has been removed by oxidation. Thereafter, cracking is again resumed and the cycle is repeated indefinitely.

An object of this invention is to provide a continuous method for cracking or otherwise treating the reacting material, and regenerating the catalytic mass employed during the reaction without substantially changing the size or shape of the catalyst particles. Another object is to provide means whereby the reacting gases may contact the catalyst countercurrently, thereby obtaining the greatest efficiency out of the catalyst. Still another object is to provide for the continuous removal of the catalyst from the reaction zone and to avoid the packing of the catalyst in the reactor. Other objects will become apparent as the description proceeds.

The invention may be more clearly understood by reference to the accompanying drawing which is a semi-diagrammatic side elevation of a preferred embodiment of the invention. Referring to the drawing which describes a catalytic cracking process, numeral 1 is a pipe or other conduit through which the feed stock (gas oil, crude oil, etc.) may be forced into a preheater 2 in indirect heat transfer relation with the cracked oil issuing from pipe 25. The feed stock thus preheated issues from the preheater through pipe 3 and enters the regenerating unit 4 through a heat transfer unit 6, which is embedded in the catalyst mass 5. The thus further preheated feed stock issues through pipe 7 and is heated in super-heater 8 to reaction temperature (900–1100° F.). From this super-heater the feed stock enters the cracking unit 10 at point 9. The cracking unit consists of a steel or other heat resisting vessel 10, containing the catalyst 11, which in this case is an acid treated bentonitic clay, and is provided with baffles 12 for entraining any clay particles which may be carried out with the issuing vapors. The clay catalyst is preferably in a pulverized or powdered form, although it is desirable not to pulverize the catalyst too finely, since it will then have a tendency to cake and pack in the cracking unit. The cracking unit is also provided at its base, with a vibrating screen 13 or other suitable foraminous member provided with means for allowing the catalyst to pass through continuously at any controlled rate without impeding the flow of the hydrocarbon vapors entering at 9 and passing upwardly through the screen countercurrently to the clay. It is desirable that the means selected for this step be such that there is substantially no change in size or shape of the catalyst particles, thereby eliminating further processing of fines, etc. Screen 12 is vibrated by a vibrating motor 13a. The fresh clay employed as the catalyst is forced into the top of the cracking unit through opening 14. Although the cracking unit may be heated, it is preferable to supply sufficient heat to the feed stock in the super-heater 8 so as to bring the feed stock to cracking temperature at point 9. A small amount of incipient cracking may take place in super-heater 8, although it is preferable to reduce such cracking to a minimum. In this manner the oil vapors are cracked in the cracking unit 10 in presence of the clay catalyst and the cracked vapors are withdrawn from the unit through line 15 into preheater 2, and out of this preheater through line 25 into a distillation vessel, storage vessel or other suitable equipment for the recovery of the antiknock gasoline produced. Provision is made at point 24 to introduce steam into the bottom of the cracking unit 10 so as to aid cracking as well as to strip the clay coming through the screen of any volatile constituents still present therein. The vibrating motor 13a is adjusted so as to vibrate screen 13 at such a velocity as to cause the clay to pass through the screen openings at a predetermined rate. It will be noted that the fresh clay entering 14 gradually works down through the cracking unit meeting the hydrocarbon vapors rising through the unit and gradually causing the inactivation of the clay catalyst. The rate of passage of the clay through the cracking unit therefore is adjusted so as to obtain as much cracking effect as possible out of the catalyst before it passes through screen 13 into settling zone 11'.

After the spent clay drops into settling zone 11', a conveyor 16 motivated by motor 17 carries the clay into the regenerating unit 4, the purpose of which is to continuously burn off the carbonaceous deposit from the clay and to regenerate it for reuse in the cracking unit. Regenerating unit 4 is also provided with a foraminous member such as screen 19 vibrated by vibrating motor 20 and with baffles 18 entraining any clay which may be carried off with the regeneration gases. The regeneration in this case is carried out with a mixture of air and steam or air diluted with inert gas which is led into regenerating unit 4 through line 21. A heat transfer unit 6 is imbedded in the clay mass 5 for preheating the feed stock to be cracked. This, however, is not an essential feature of the invention, although it is desirable to recover as much of the regeneration heat as possible in order to make the process economically profitable. The spent clay from conveyor 16 is gradually fed into regenerating unit 4 and the vibration of the screen 19 is so adjusted that the regenerating clay falls through its openings at substantially the same rate as that of the spent clay entering the regenerating unit. The spent clay, therefore, enters the regenerating unit at point 26 and gradually works down to screen 19 becoming more and more reactivated due to the gradual burning off of the carbonaceous deposit thereon. Its rate, of course, is adjusted so that when it drops through the openings of screen 19 it is of substantially the same or possibly somewhat lower activity as that of the fresh clay entering cracking unit 14. This recovered clay therefore settles in space 22 and is removed by withdrawal at point 23 and may be circulated back to point 14 to further catalyze the cracking operation.

The rate of the feed stock entering cracking unit at 9 may be adjusted to obtain the optimum gasoline yield or it may be adjusted so as to obtain only a small percentage of cracking per pass. In this latter case, the amount of hydrocarbon under the conditions of operation would be in the range of 25–50 cubic feet per cubic foot of clay catalyst employed. However, it is desirable to maintain a high enough velocity of the hydrocarbon vapor in the cracking unit to exert a lifting effect upon the clay particles, thereby reducing the strain on the screen due to the weight of the catalyst as well as preventing caking, channeling, and the formation of dead space in the clay catalyst mass. At point 24, besides steam, there may be introduced into the reactor various other agents to aid the cracking reaction or to reduce the tendency to form carbon upon the catalyst surface. As pointed out previously, it is desirable to vaporize as much of the feed stock as possible before it enters the cracking unit at point 9.

By employing the foregoing process, it is possible to crack a raw material such as gas oil continuously without interruption, thereby avoiding the objectionable cyclic system generally used.

Various other modifications may be made, and this invention is not limited to any particular examples or theories of operation, but merely by the following claims in which the intention is to cover the invention as broadly as the prior art permits.

I claim:

1. A process for carrying out chemical reactions with relatively heavy hydrocarbons in the presence of a catalyst which gradually becomes inactivated during the reaction by the deposition thereon of a combustible deposit, comprising feeding the catalyst in a finely divided condition in a reaction vessel in countercurrent contact with hydrocarbon vapors to be reacted, allowing a sufficient time of contact of the catalyst with the hydrocarbon vapors until the catalyst is substantially inactivated, allowing the thus inactivated catalyst to pass, without substantial change in size and shape, through a moving foraminous member through which there is simultaneously and countercurrently passing the hydrocarbon vapors to be reacted, and removing the inactivated catalyst.

2. Process according to claim 1 in which the relatively heavy hydrocarbons are subjected to cracking conditions to produce lower boiling hydrocarbons.

3. Process according to claim 1 in which the catalyst is a granulated aluminum silicate.

4. Process according to claim 1 in which the catalyst is an acid treated bentonitic clay.

5. Process according to claim 1 in which the hydrocarbon vapors to be reacted are passed through the catalyst at a rate high enough to exert a lifting action upon the catalyst to reduce the strain on the foraminous member, to prevent caking, channeling and formation of a dead space in the reaction vessel.

6. Process according to claim 1 in which the foraminous member is a vibrating screen.

7. Process according to claim 1 in which the relatively heavy hydrocarbons to be reacted are preheated to cracking temperature prior to their admission into said reaction vessel.

8. Process according to claim 1 in which the inactivated catalyst passing through the foraminous member is led into a regenerating unit wherein the inactivated catalyst passes countercurrently to the regeneration medium capable of removing the inactivating material from the catalyst at combustion temperature, said inactivated catalyst being subjected to the action of the regenerating medium for such a time as to become regenerated to approximately its initial activity, allowing the thus reactivated catalyst to pass, without substantial change in size and shape, through another foraminous member through which there is passing simultaneously and countercurrently the regeneration medium, collecting the recovered catalyst removed from the regenerating unit and passing the relatively heavy hydrocarbons in indirect heat exchange with the catalyst material being regenerated to cool the catalyst material and preheat the relatively heavy hydrocarbons before introducing them into said reaction vessel.

PETER J. GAYLOR.